(12) United States Patent
Linzer

(10) Patent No.: US 6,940,909 B2
(45) Date of Patent: Sep. 6, 2005

(54) VIDEO DECODING DURING I-FRAME DECODE AT RESOLUTION CHANGE

(75) Inventor: Elliot N. Linzer, Suffern, NY (US)

(73) Assignee: LSI Logic Corporation, Milpitas, CA (US)

(*) Notice: Subject to any disclaimer, the term of this patent is extended or adjusted under 35 U.S.C. 154(b) by 223 days.

(21) Appl. No.: 10/629,507

(22) Filed: Jul. 29, 2003

(65) Prior Publication Data

US 2005/0025250 A1 Feb. 3, 2005

(51) Int. Cl.[7] ................................................ H04B 1/66

(52) U.S. Cl. .................... 375/240.25; 375/240.26; 375/240.28; 375/240.01; 348/426; 348/441; 382/233

(58) Field of Search ................. 375/240.25, 240.26, 375/240.28, 240.01; 348/426, 441; 382/233

(56) References Cited

U.S. PATENT DOCUMENTS

| 5,502,494 A | * | 3/1996 | Auld | 375/240.25 |
| 5,731,838 A | * | 3/1998 | Gunji et al. | 375/240.16 |
| 6,633,608 B1 | * | 10/2003 | Miller | 375/240.02 |

* cited by examiner

Primary Examiner—Shawn S. An
(74) Attorney, Agent, or Firm—Christopher P. Maiorana, P.C.

(57) ABSTRACT

A method of buffering a video signal is disclosed. The method generally includes the steps of (A) storing a plurality of pictures decoded from the video signal having a first resolution in a memory space divided into a plurality of first buffers each having a first size, (B) dividing the memory space into a plurality of second buffers each having a second size in response to the pictures in the video signal changing to a second resolution, and (C) converting at least one unavailable buffer of the second buffers to an available condition by marking at least one unread picture of the pictures from the memory space as destroyed.

22 Claims, 5 Drawing Sheets

DIVIDING FIXED DECODED
PICTURE BUFFER INTO 16
SMALL PICTURES

DIVIDING FIXED DECODED
PICTURE BUFFER INTO 5
BIG PICTURES

VIDEO DECODING DURING I-FRAME DECODE AT RESOLUTION CHANGE

FIELD OF THE INVENTION

The present invention relates to video decoding generally and, more particularly, to a video decoder with dummy frames and available buffer search during I-frame decode at resolution change.

BACKGROUND OF THE INVENTION

Compression of digital video data is used for many applications including transmission over bandwidth-constrained channels, such as direct broadcast satellite, and storage on optical media. In order to achieve very efficient compression, complex, computationally intensive processes are used for encoding (compressing) and decoding (decompressing) video. For example, although MPEG-2 (Moving Pictures Expert Group, International organization for Standards, Geneva, Switzerland) is known as a very efficient method for compressing video, a new, more efficient standard, H.264 ("Advanced Video Coding", International Telecommunication Union Telecommunication Standardization Sector, Geneva, Switzerland), is being developed.

The H.264 standard allows for bitstreams that (1) use a large number of reference frames to reconstruct a single picture and (2) use reordering schemes that transmit many "future frames" with later display times then a current picture before the current picture is transmitted. By contrast, MPEG-1 and MPEG-2 allow for at most two reference frames for reconstructing a picture and only a single future frame.

Referring to FIG. 1, a diagram illustrating a conventional bitstream 10 that uses many reference frames is shown. In the illustration, a group of pictures (frames) having six pictures is represented by one I-frame 12 followed by five P-frames 14a–e. Each P-frame 14a–e after the I-frame 12 uses all of the previous frames in the group of pictures as references, so that the last P-frame 14e has five reference frames 12 and 14a–d.

Referring to FIG. 2, a diagram illustrating a conventional bitstream 16 that uses many "future frames" is shown. The bitstream 16 is shown in a display order with arrows indicating how reference frames are used for prediction. Like groups of pictures often used for MPEG-1 and MPEG-2, each P-frame 18a–f is predicted from one I-frame 20 or P-frame 18a–f, and each B-frame 22a–l is predicted from two frames, each of which is an I-frame 20 or a P-frame 18a–f. However, the H.264 standard allows the I-frame 20 to be displayed in the middle of the group of pictures. The frames 18a–c and 22a–f that are displayed before the I-frame 20 are predicted in the opposite direction as usual, that is the P-frames 18a–c before the I-frame 20 use backward only, instead of forward only, prediction. Thus, the I-frame 20 is transmitted first but is displayed tenth. Depending on the transmission order of the B-frames 22a–l (i.e., if the B-frames 22a–f before the I-frame 20 are transmitted in display order, backwards display order, or something else), the decoder will need to buffer five to ten frames to decode and display the bitstream 16.

The flexible approach permitted by the H.264 standard for creating bitstreams results in the decoder buffering a large amount of image data. To limit the amount of memory that a decoder reasonably uses for decoding, the H.264 standard places two constraints on the bitstreams (i) a bitstream cannot be constructed so that the total number of bytes of decompressed pictures buffered at the decoder exceeds a limit B and (ii) a bitstream cannot be constructed so that the total number of decompressed frames buffered at the decoder exceeds a limit F. For example, for a level 4 (high definition) stream, at any time, the decoder will never hold more than sixteen frames or any number of frames that use more than 12,288×1024 bytes in total.

The H.264 standard allows for a resolution of compressed pictures in a single bitstream to change. Thus, the maximum number of frames buffered over time will vary with the resolution of the frames. When low-resolution frames are used, many frames are commonly buffered. When high-resolution frames are used, few frames are commonly buffered.

If memory is accessed through register read-write instructions using virtual linear memory, the total amount of memory that a decoder will allocate for decoded pictures is roughly the nominal limit given by the H.264 standard (i.e., 12,288 Kbytes for level 4). In practice an actual decoder uses slightly more memory when not operating exactly according to the principles of the H.264 reference decoder. For example, an extra delay between decoding and display introduced for scaling or other display processing consumes additional memory.

A conventional video decoder allocates physically contiguous buffers for the maximum number of frames used for decoding times the maximum size of each frame. The buffers are used for storing frames as the frames are decoded and freed when the frames are no longer needed (i.e., the frames that have been displayed and will no longer be used as references for other frames). The conventional approach will use much more memory than a nominal amount of memory if the number of frames to be buffered depends on the resolution of the frames.

SUMMARY OF THE INVENTION

The present invention concerns a method of buffering a video signal. The method generally comprises the steps of (A) storing a plurality of pictures decoded from the video signal having a first resolution in a memory space divided into a plurality of first buffers each having a first size, (B) dividing the memory space into a plurality of second buffers each having a second size in response to the pictures in the video signal changing to a second resolution, and (C) converting at least one unavailable buffer of the second buffers to an available condition by marking at least one unread picture of the pictures from the memory space as destroyed.

The objects, features and advantages of the present invention include providing a method and a video decoder with dummy frames that may (i) decode and display a video sequence having a resolution change, (ii) detect the resolution change in the bitstream, (iii) discard undisplayed pictures decoded prior to the resolution change, (iv) display dummy pictures instead of the discarded pictures after the resolution change, (v) repeat the last picture displayed instead of the discarded pictures, (vi) display a first picture at a new resolution in place of the discarded pictures and/or (vii) skip displaying substitute pictures for the discarded pictures.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
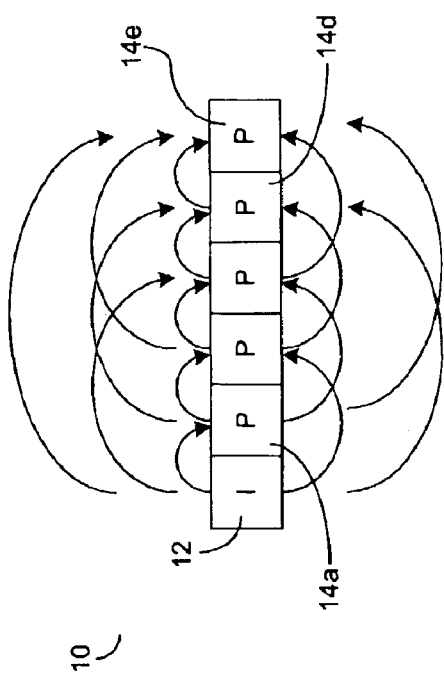
FIG. 1 is a diagram illustrating a conventional bitstream that uses many reference frames.
Figure 2:
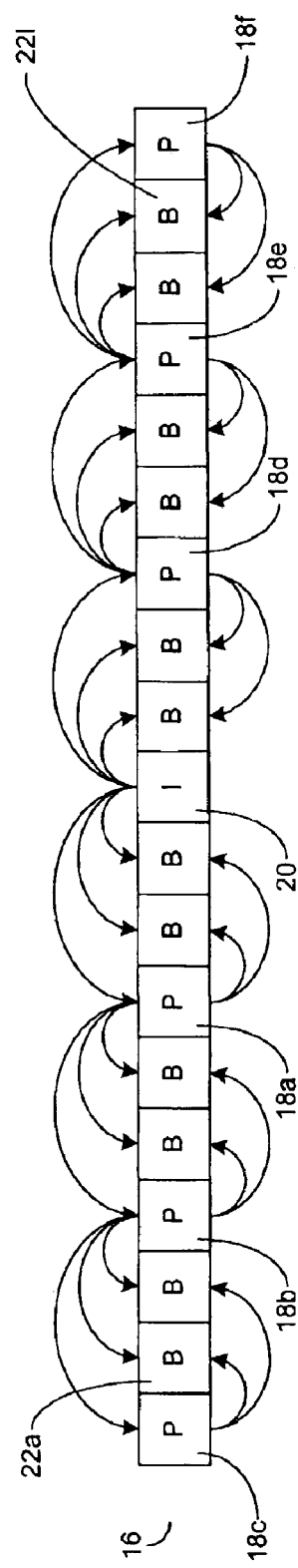
FIG. 2 is a diagram illustrating a conventional bitstream that uses many future frames.
Figure 3:
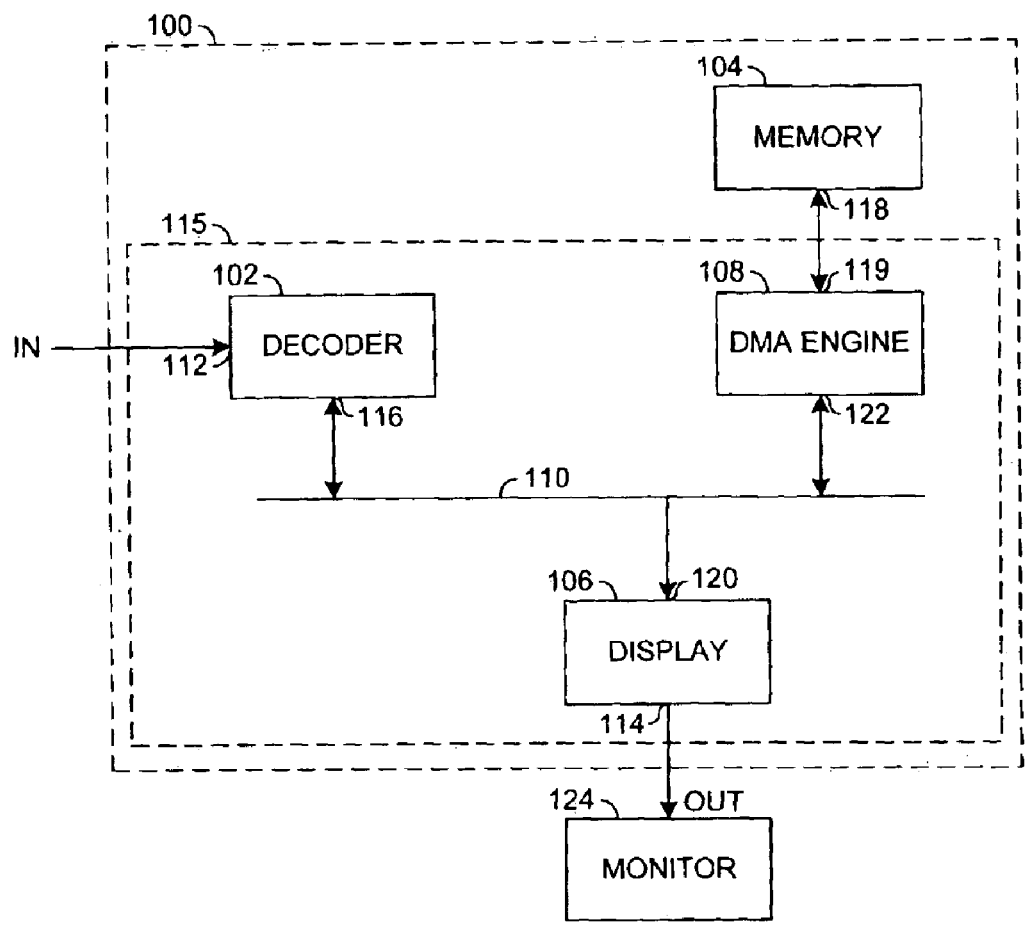
FIG. 3 is a block diagram of an example implementation of a circuit in accordance with a preferred embodiment of the present invention.

Referring to FIG. 3, a block diagram of an example implementation of a circuit 100 in accordance with a preferred embodiment of the present invention is shown. The circuit 100 may be implemented as a decoder circuit. The decoder circuit 100 generally comprises a block (or module) 102, a block (or module) 104, a block (or module) 106, a block (or module) 108 and a bus 110. An input 112 of the block 102 may receive a signal (e.g., IN). An output 114 of the block 106 may present a signal (e.g., OUT). The blocks 102, 106 and 108 may be fabricated in a common integrated circuit 115.

The block 102 may be implemented as a decoder block. The decoder block 102 may have an interface 116 to the bus 110. The decoder block 102 may be operational to decode an encoded bitstream compliant with the H.264 standard. Decoding of other bitstream standards may be implemented to meet the criteria of a particular application.

The block 104 may be implemented as a memory block. An interface 118 may connect the memory block 104 to an interface 119 of the block 108. The memory block 104 may define a memory space over an address range accessible via the bus 110. The memory block 104 may be organized to store frames (pictures) decoded from the signal IN and presented for display in the signal OUT.

The block 106 may be implemented as a display block. An interface 120 may connect the display block 106 to the bus 110. The display block 106 may be operational to generate the signal OUT using the frames stored in the memory block 104. The frames read from the memory block 104 may be converted into a displayable format by the display block 106.

The block 108 may be implemented as a direct memory access (DMA) block. The DMA block-108 may have an interface 122 to the bus 110 and the interface 119 to the memory block 104. The DMA block 108 may be configured to transfer frame data and other data to and from the memory block 104, the decoder block 102, the display block 106 and any other block on the bus 110 requesting access to the memory block 104.

The signal IN may be implemented as a digital video signal or bitstream. The bitstream IN may be encoded according to the H.264 standard. Frame data within the bitstream IN may be received in a transmission order. Other encoding standards may be implemented to meet the criteria of a particular application.

The signal OUT may be implemented as a video signal. The video signal OUT may be generated in a format suitable for displaying on a screen (or monitor) 124. Frame data within the video signal. OUT may be presented at the output 114 in a viewing order. The viewing order may be different from the transmission order.

Figure 4:
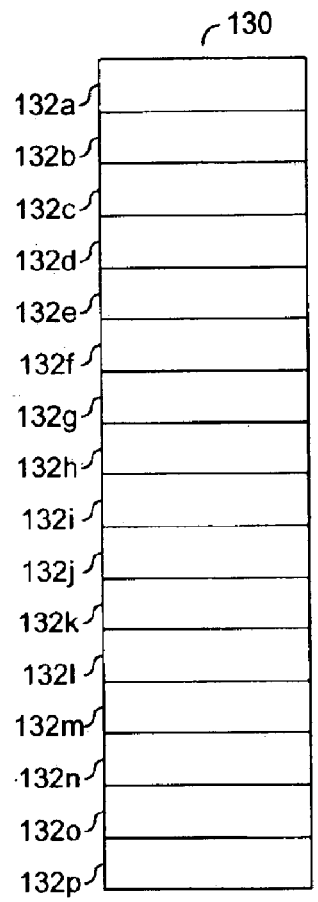
FIG. 4 is an illustration of a first example partition of a memory space for a memory block.

Referring to FIG. 4, an illustration of a first example partition of a memory space 130 for the memory block 104 is shown. When decoding pictures of a fixed size, the decoder block 102 may break up physically contiguous areas of the memory space 130 into multiple physically contiguous picture buffers 132a–p. For example, the memory space 130 may be divided into sixteen picture buffers 132a–p to accommodate the H.264 standard level 4 frame limit F. As long as the decoder block 102 may be decoding pictures of a fixed resolution, the picture buffers 132a–p may be reused for every picture decoded. When a particular picture is no longer needed (e.g., for display or as a reference frame), the picture buffer 132a–p storing the particular picture is generally freed and may be reused to assemble another picture. Thus, even if physically contiguous picture buffers (e.g., 132b and 132c) are used for a fixed-resolution stream, the amount of memory space 130 that the decoder 102 generally allocates for decoded pictures may be substantially similar to the maximum amount of memory space 130 that the decoded pictures may occupy per the H.264 standard.

Figure 5:
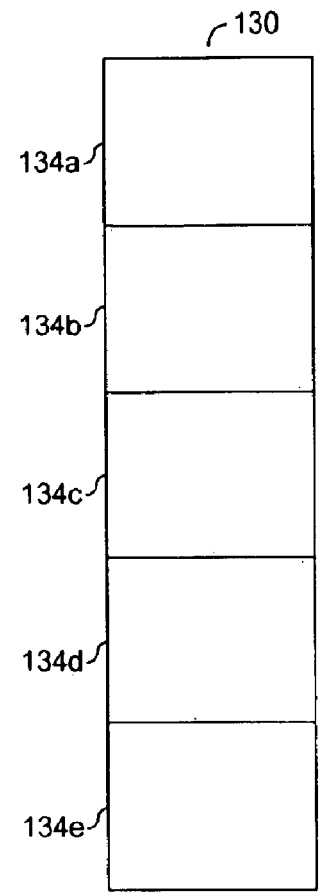
FIG. 5 is an illustration of a second example partition of the memory space.

Referring to FIG. 5, an illustration of a second example partition of the memory space 130 is shown. The memory space 130 may be dynamically arranged by the decoder block 102 into different sized picture buffers to accommodate different sized decoded frames. For example, the memory space 130 may be partitioned into five picture buffers 134a–e to store high resolution pictures. A size of each of the pictures buffers 134a–e may be different from the size of each of the picture buffers 132a–p (FIG. 4). Dynamic rearranging of the memory space 130 may be useful where the bitstream IN transitions between first resolution (size) frames and second resolution (size) frames one or more times during transmission. Using conventional approaches for memory partitioning, no known way exists to ensure that physically contiguous picture buffers are found for the newly decoded pictures when a resolution change occurs without using a large memory block 104.

Figure 6:
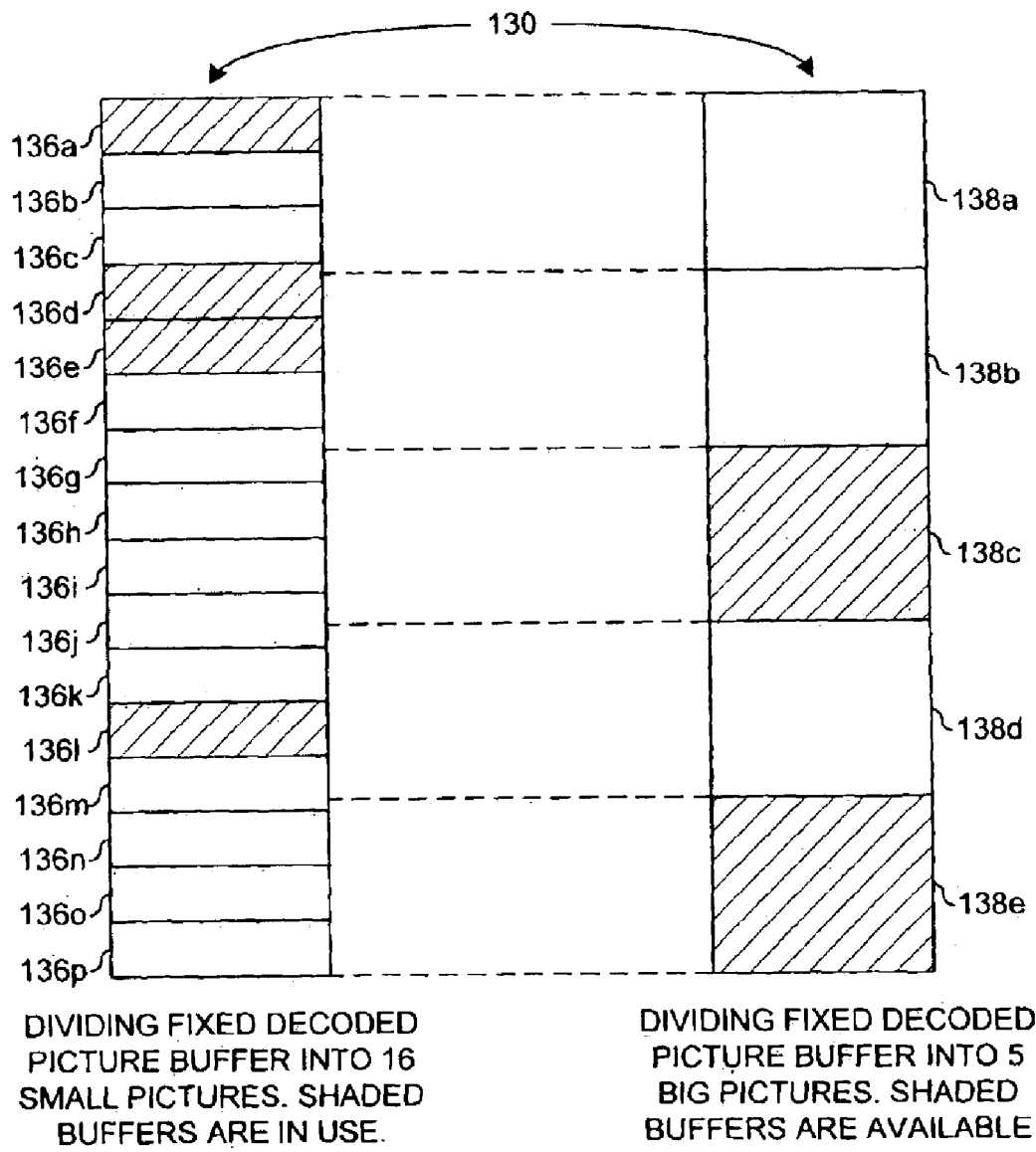
FIG. 6 is an illustration for a first example transition between two picture sizes.

Referring to FIG. 6, an illustration for a first example transition between two picture sizes is shown. Upon receipt of the bitstream IN, the decoder block 102 may determine a resolution of the frames. The resolution of the frames may be used to calculate a size of each decoded picture. The decoder block 102 may divide the memory space 130 into a first set of contiguous picture buffers 136a–p (contiguous physical address ranges), each having the size of the pictures.

The decoder block 102 may then decode pictures from the bitstream IN based on frame type and order received. The decoded pictures may be written into the "old" picture buffers 136a–p in either the decoding order or a display order. The display block 106 generally reads the pictures from the old picture buffers 136a–p in the display order to generate the video signal OUT. The video signal OUT may be displayed and/or recorded in decompressed form.

Upon detection of a resolution change in the bitstream IN, the decoder block 102 may divide the memory space 130 into a second set of contiguous picture buffers 138a–e (contiguous physical address ranges), each having a size of the new pictures. Some of the "new" picture buffers 138a–e of the new size may overlap the old picture buffers 136a–p of the old size. For example, the new picture buffer 138a may overlap all of the old picture buffers 136a–b and a portion of the old picture buffer 136c. In general, a ratio between the old size of an old picture buffer (e.g., 136a) and the new size of a new picture buffer (e.g., 138a) may be an integer ratio or a non-integer ratio.

During and immediately after rearranging the memory space 130, one or more of the old picture buffers 136a–p may still hold old pictures that have not been read for display. The display block 106 may continue to view the memory space 130 as being arranged per the old picture buffers 136a–p while old pictures remain to be displayed. The memory space 130 occupied by other old picture buffers 136a–p may be available to accept new picture data. For example, old picture buffers 136a, 136d–e, and 136l may be in use while old picture buffers 136b–c, 136f–k and 136m–p may have an available condition. Because of the available/unavailable condition or state of the old picture buffers 136a–p, some of the new picture buffers 138a–e may be immediately available to receive new pictures while other new picture buffers 138a–e may be unavailable. For example, new picture buffers 138a–b and 138d may have an unavailable condition due to old pictures still stored within the respective address ranges of the old picture buffers 136a, 136d–e and 136l. The new picture buffers 138c and 138e may have an available condition as the decoder block 102 and the display block 106 may be finished with the old pictures store within.

Before a first new picture is decoded, the decoder block 102 may examine the memory space 130 for available new picture buffers 138a–e. If at least one new picture buffer 138a–e is available, the available new picture buffer 138a–p may be used to store the first new picture being decoded. If there are no new picture buffers 138a–e available, the decoder block 102 may mark one or more as-of-yet undisplayed old pictures as "destroyed" and free the memory space 130 from the respective old picture buffer 136a–p for use by a new picture buffer 138a–e. As the second, third, and subsequent new pictures are decoded, additional undisplayed old picture may be marked as destroyed to convert unavailable new picture buffers 138a–e into available new picture buffers 138a–e.

The decoder block 102 may mark old pictures as destroyed based on a display sequence of the old pictures remaining in the memory space 130. For example, the old pictures may be marked using a last-displayed-first-destroyed prioritization method such that the last old picture to be read from the memory block 104 for display may be the first old picture to be destroyed or written over by a new picture. Other methods for determining which old pictures to mark and when to mark may be implemented to meet the criteria of a particular application.

Before displaying an old picture, the display block 106 may determine if the old picture has been marked as destroyed or not. If not marked as destroyed, the display block 106 may display the old picture. If the old picture has been marked as destroyed, the display block 106 may display a dummy picture instead. Examples of dummy pictures include, but are not limited to solid-color pictures (e.g., black), or a different picture (old or new) from the same stream. For example, the display block 106 may repeatedly present the last old picture actually displayed in place of each old picture destroyed (and thus unavailable for display). In another example, the display block 106 may display the first new picture decoded in place of each destroyed old picture. In still another example, the display block 106 may skip the destroyed old pictures and proceed directly from the last actually displayed old picture directly to the first new picture. After all of the non-destroyed old pictures have been read from the memory block 104, the display block 106 may view the memory space 130 as being arranged per the new picture buffers 138a–3.

After a resolution change, old pictures having the old resolution and still available in the memory space 130 cannot be used as reference frames for new pictures having the new resolution. Since all of the old pictures from the bitstream IN have been decoded before decoding begins on the first new picture, destroying one or more old pictures generally means only that the destroyed old picture may be replaced by a dummy picture at display time. The absence of the destroyed old pictures in the memory block 104 generally has no impact on the decoding of any other picture. If a new picture is destroyed due to lack of an available new picture buffer 138a–e, additional new pictures may be lost if the destroyed new picture was a reference frame for the additional new pictures.

Figure 7:
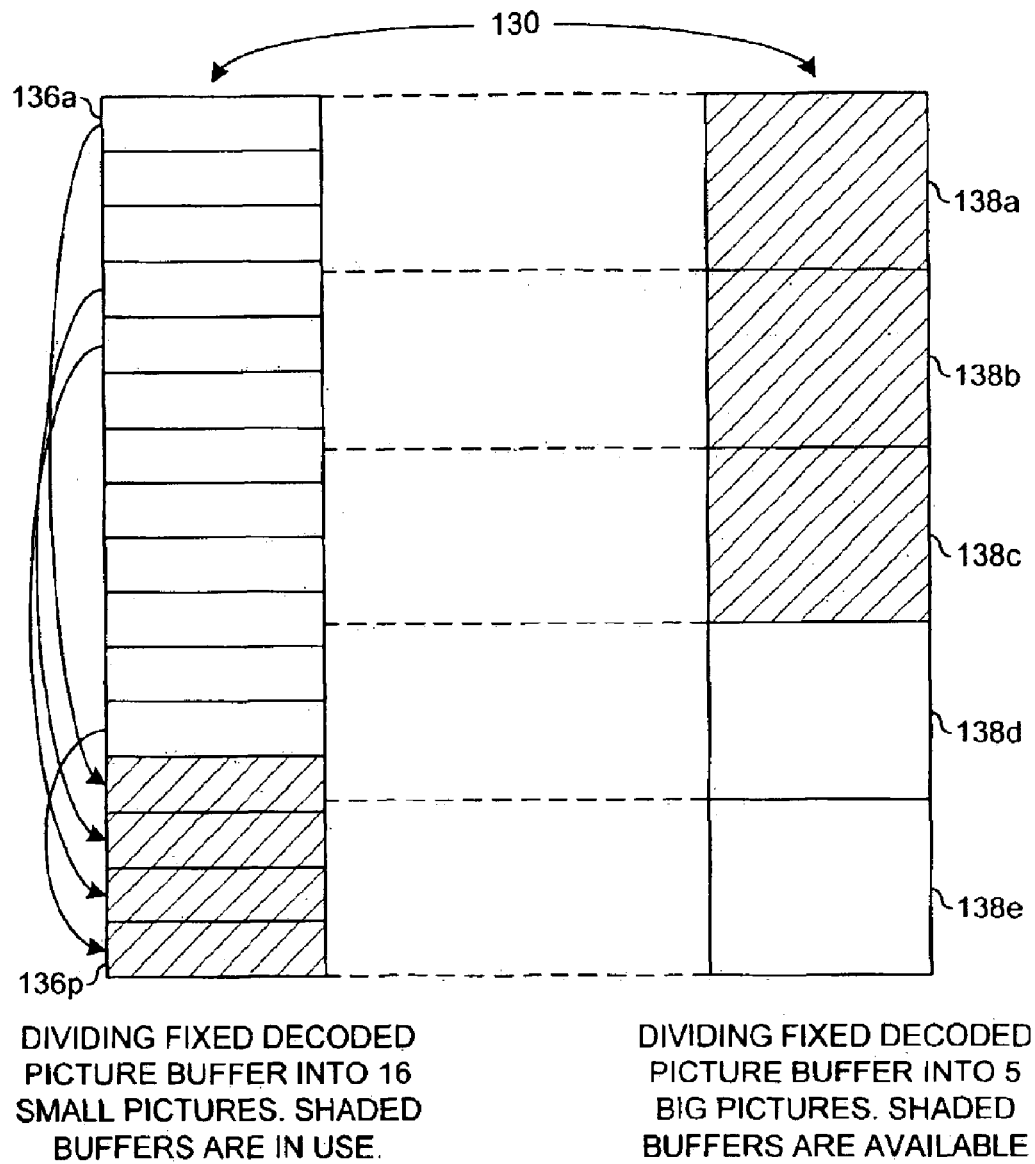
FIG. 7 is an illustration for a second example transition between two picture sizes.

Referring to FIG. 7, an illustration for a second example transition between two-picture sizes is shown. When a resolution change occurs in the bitstream IN, the first new picture to be decoded will be an I-frame picture. Decoding an I-frame generally uses very little bandwidth of the memory 104. Even if limited memory bandwidth is available while decoding an inter-frame (e.g., P-frame or B-frame), the decoder circuit 100 may still have a sufficient memory bandwidth to recopy some of the old pictures while substantially simultaneously decoding the new picture. Thus, the decoder circuit 100 may (i) decode the "resolution change" first new picture and (ii) partially or fully de-fragment the old picture buffers 136a–p in parallel operations. As such, moving the decoded old pictures within the memory space 130 may free more of the new picture buffers 138a–e to store the new pictures. Movement of the old pictures may be stopped upon completing the decoding of the first new picture or some predetermined number of new pictures.

Movement of the old pictures may be explained by way of the following example. The unavailable new picture buffer 138d in FIG. 6 may be converted to the available condition in FIG. 7 by moving the old picture in the old picture buffer 136l in FIG. 6 to the old picture buffer 136p in FIG. 7. The unavailable new picture buffer 138b in FIG. 6 may be converted to the available new picture buffer 138b in FIG. 7 by moving the old pictures in the old picture buffers 136d–e in FIG. 6 to the old picture buffer 136n–o in FIG. 7. The unavailable new picture buffer 138a in FIG. 6 may transition to the available condition in FIG. 7 by moving the old picture from the old picture buffer 136a in FIG. 6 to the old picture buffer 136m in FIG. 7. After rearranging the old pictures, the memory space 130 may have three contiguous available new picture buffers 138a–c and two contiguous unavailable new picture buffers 138d–e.

The function performed by the decoder circuit 102 as described above may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAS, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, and magneto-optical disks, ROMS, RAMs, EPROMs, EEPROMs, Flash memory, magnetic or optical cards, or any type of media suitable for storing electronic instructions. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art, that various changes in form and details may be made without departing from the spirit and scope of the invention.

What is claimed is:

1. A method of buffering a video signal, comprising the steps of:
   (A) storing a plurality of pictures decoded from said video signal having a first resolution in a memory space divided into a plurality of first buffers each having a first size;
   (B) dividing said memory space into a plurality of second buffers each having a second size in response to said pictures in said video signal changing to a second resolution; and
   (C) converting at least one unavailable buffer of said second buffers to an available condition by marking at least one unread picture of said pictures from said memory space as destroyed.

2. The method according to claim 1, wherein step (C) further comprises the sub-step of:
   prioritizing said unread pictures in said memory space on a last-displayed-first-destroyed basis.

3. The method according to claim 1, further comprising the step of:
   displaying each of said pictures read from said memory space.

4. The method according to claim 1, further comprising the step of:
   displaying a predetermined picture in place of each of said unread pictures marked as destroyed.

5. The method according to claim 1, further comprising the step of:
   displaying a last read picture of said pictures having said first resolution in place of each of said unread pictures marked as destroyed.

6. The method according to claim 1, further comprising the step of:
   displaying a first picture of said pictures having said second resolution in place of each of said unread pictures marked as destroyed.

7. The method according to claim 1, further comprising the step of:
   skipping said unread pictures marked as destroyed from displaying.

8. A circuit comprising:
   a memory defining a memory space divided into a plurality of first buffers each having a first size; and
   a decoder configured to (i) store a plurality of pictures decoded from a video signal having a first resolution in said memory space, (ii) divide said memory space into a plurality of second buffers each having a second size in response to said pictures in said video signal changing to a second resolution and (iii) convert at least one unavailable buffer of said second buffers to an available condition by marking at least one unread picture of said pictures from said memory space as destroyed.

9. The circuit according to claim 8, wherein each of said first buffers holds one of said pictures having said first resolution.

10. The circuit according to claim 8, wherein said first size is different than said second size.

11. The circuit according to claim 8, wherein at least one of said unavailable buffers converted to said available condition has a first physical address range contiguous to a second physical address range for an available buffer of said second buffers.

12. A method of buffering a video signal, comprising the steps of:
    (A) storing a plurality of pictures decoded from said video signal having a first resolution in a memory space divided into a plurality of first buffers each having a first size;
    (B) dividing said memory space into a plurality of second buffers each having a second size in response to said pictures in said video signal changing to a second resolution; and
    (C) converting at least one unavailable buffer of said second buffers to an available condition by moving each unread picture of said pictures toward an end of said memory space.

13. The method according to claim 12, further comprising the step of:
    converting at least one of said unavailable buffers to said available condition by marking at least one unread picture of said pictures from said memory space as destroyed.

14. The method according to claim 12, further comprising the step of:
    ending movement of said unread pictures toward said end of said memory space upon completing decoding for a first picture of said pictures having said second resolution.

15. The method according to claim 12, further comprising the step of:
    displaying a predetermined picture in place of each of said unread pictures marked as destroyed.

16. The method according to claim 12, further comprising the step of:
    displaying a last read picture of said pictures having said first resolution in place of each of said unread pictures marked as destroyed.

17. The method according to claim 12, further comprising the step of:
    displaying a first picture of said pictures having said second resolution in place of each of said pictures marked as destroyed.

18. The method according to claim 12, further comprising the step of:
    decoding said pictures having said second resolution substantially simultaneously with moving said unread pictures toward said end of said memory space.

19. A circuit comprising:
    a memory defining a memory space divided into a plurality of first buffers each having a first size; and
    a decoder configured to (i) store a plurality of pictures decoded from a video signal having a first resolution in said memory space, (ii) divide said memory space into a plurality of second buffers each having a second size in response to said pictures in said video signal changing to a second resolution and (iii) convert at least one unavailable buffer of said second buffers to an available condition by moving each unread picture of said pictures toward an end of said memory space.

20. The circuit according to claim 19, further comprising a direct memory access module configured to exchange said pictures with said memory.

21. The circuit according to claim 19, wherein each of said second buffers holds one of said pictures having said second resolution.

22. The circuit according to claim 19, wherein a ratio between said first size and said second size is a non-integer.

* * * * *